United States Patent [19]

Esnoult et al.

[11] 4,376,805

[45] Mar. 15, 1983

[54] FUSED CAST BLOCKS BASED ON REFRACTORY OXIDES AND HAVING A STEEL MEMBER EMBEDDED THEREIN

[75] Inventors: Marc Esnoult, Sorgues; Jean-Claude Hugues, Le Thor, both of France

[73] Assignee: Societe Europeenne des Produits Refractaires, Neuilly-sur-Seine, France

[21] Appl. No.: 215,103

[22] Filed: Dec. 10, 1980

Related U.S. Application Data

[62] Division of Ser. No. 62,289, Jul. 31, 1979, abandoned.

[30] Foreign Application Priority Data

Aug. 8, 1978 [FR] France .................................. 78 23340

[51] Int. Cl.$^3$ .......................... B32B 9/00; B32B 15/04
[52] U.S. Cl. ..................................... 428/409; 52/600; 264/135; 264/265; 264/332; 428/357; 428/472; 428/689
[58] Field of Search ............... 428/688, 689, 472, 384, 428/385, 386, 389, 397, 409, 357; 52/596, 600, 601, 602; 264/274, 279, 241, 135, 332, 265

[56] References Cited

U.S. PATENT DOCUMENTS

| | | | |
|---|---|---|---|
| 2,527,063 | 10/1950 | Heuer | 264/274 X |
| 2,652,793 | 9/1953 | Heuer et al. | 52/596 |
| 2,799,233 | 7/1957 | Heuer | 52/596 |
| 3,284,979 | 11/1966 | Edwards | 52/600 |
| 3,376,681 | 4/1968 | DeMaison | 52/600 X |
| 3,662,058 | 5/1972 | Crespi | 264/332 |
| 3,824,113 | 7/1974 | Loxley et al. | 427/431 |

Primary Examiner—Lorraine T. Kendell
Attorney, Agent, or Firm—Watson, Cole, Grindle & Watson

[57] ABSTRACT

The invention relates to a fused cast block useful in the construction of steel making furnaces, the block comprising a refractory oxide-based material having embedded therein a steel member which extends over the greater part of the length of the block and emerges from the block on the outer face of the latter, the steel member being embedded in the block in the course of molding the latter and having a cross-section of suitable shape and surface area to impart to the composite block an apparent thermal conductivity at between 500° and 1000° C. of at least 8 Kcal. m./m$^2$.°C. hr.

6 Claims, 3 Drawing Figures

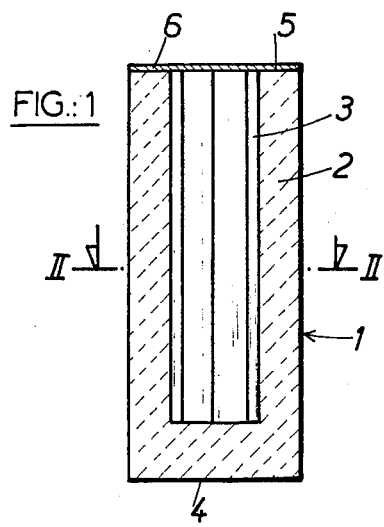
FIG.:1
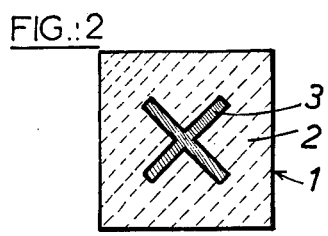
FIG.:2
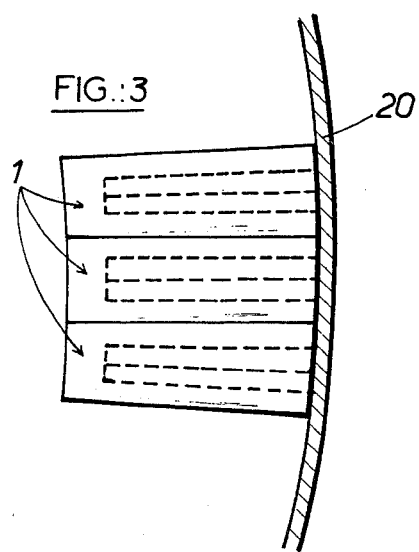
FIG.:3

FUSED CAST BLOCKS BASED ON REFRACTORY OXIDES AND HAVING A STEEL MEMBER EMBEDDED THEREIN

This application is a divisional application of application Ser. No. 62,289, filed July 31, 1979, now abandoned.

BACKGROUND OF THE INVENTION

1. Field of the Invention

The invention relates to fused cast blocks based on refractory oxides and having a steel member embedded therein, the blocks being useful, in particular, for the construction of high-productivity steel-making furnaces, especially for the parts of these furnaces which are not in prolonged contact with the liquid metal bath.

2. The Prior Art

For some years, the power of arc furnaces relative to their capacity, or their specific power expressed as the nominal KVA power of their transformer per ton of liquid steel, has been on the increase, and frequently exceeds 500 KVA/ton (in the case of a UHP furnace). The used power even sometimes reaching 750 KW/ton during the fusion period. This trend results in the need for new methods of lining the walls of the furnaces.

The zones of the arc furnace linings which are exposed to the most severe conditions, that is to say the slag line, the tap hole and, particularly, the parts of the wall which are located opposite the three electrodes, currently most commonly consist of fused cast refractory blocks of magnesia/chromium oxide.

These fused cast refractory blocks are in the form of blocks which have been sawn into ingots, the shrinkage cavity of which, on solidification, has been dispersed in a macroporosity, consisting of pores of diameter from 1 to 10 mm, the total porosity due to these being from 16 to 20%, together with a very slight microporosity, and this, together with the very high crystalline cohesion of the blocks, makes the latter superior to other refractory materials such as fired basic refractory materials, or even materials made of rebonded fused grains.

The use of these blocks for constructing the zones of arc furnace linings which are exposed to the most severe conditions, in combination with less high-grade refractory materials for constructing the zones exposed to less severe conditions, generally makes it possible to balance the wear profile of the linings for a wide range of furnace power and capacity, and to optimize the productivity and cost of the refractory materials.

When the operating conditions become too severe, and in particular when the specific power used during the fusion period exceeds 500 KW/ton and when the heat flux reaching the lining cannot be reliably controlled, the use of such refractory blocks no longer makes it possible to achieve reasonable lengths of service life. In effect, the fused cast refractory blocks become destroyed too rapidly, especially at the "hot" points of the lining. This destruction can result from high temperature chemical attack by fumes and slag spray, or from flaking of the working faces as a result of rapid variations of temperature, these two phenomena taking place at varying speeds and to varying extents depending on the method of operation of the furnaces.

One solution to the above problems has consisted in constructing furnace linings free from refractory blocks and consisting of water-cooled metallic members. These linings also have disadvantages;

they are expensive to install and their life is also short if the specific power used for fusion reaches 750 KW/ton, they are large consumers of pure water, which is not always easily available, and which can cause severe explosions in the event of a leak, they considerably increase, by 10 to 20 KWh/ton, the energy consumption relative to that encountered with the above-mentioned linings, which is not desirable in view of the current needs to save energy, and above all, they do not completely solve the problem because the explosion hazard becomes excessive if they are used too close from the metal bath.

The present invention provides composite refractory blocks for lining steelmaking furnaces, which blocks constitute an advantageous compromise between the prior art solutions reviewed above.

SUMMARY OF THE PRESENT INVENTION

More particularly, the invention concerns a fused cast refractory block made of a material based on at least one refractory oxide, and in which is embedded at least one steel member having a higher thermal conductivity than that of the oxide-based material, this member extending over at least the greater part of the length of the block and emerging from the block at the outer face of the latter.

By "length of the block" is meant the dimension of the latter which will be at right angles to the furnace lining. By "outer face" is meant the face of the block which will point towards the exterior of the furnace. Conversely, the inner face will be the face of the block pointing towards the interior of the furnace.

The body of the block consists, as indicated, of a refractory material based on at least one refractory oxide. MgO, $Cr_2O_3$, $Al_2O_3$, $ZrO_2$, $TiO_2$ and $SiO_2$, individually or as a mixture, may be mentioned as oxides which can be used. It should be noted that the refractory materials of this type frequently contain, additionally to the principal oxides mentioned above, small amounts of other oxides, such as alkali metal oxides and alkaline earth metal oxides, iron oxides and the like, originating from the raw materials used, which can, as this is well known, be oxides or substances (for example carbonates) which are converted to the desired oxides by heating. The oxide-based refractory materials which can be used are known materials and do not themselves form part of the invention. Materials which are useful in the invention are described, to give an example without implying a limitation, in U.S. Pat. Nos. 2,113,818 and 2,599,566 and in French Pat. No. 1,200,776. The useful materials have a thermal conductivity of between 3 and 10 $Kcal.m/m^2.°C.hr.$ at between 500° and 1000° C.

The member which is embedded in the body of the block consists of steel, the thermal conductivity of which is at least about 20 $Kcal.m/m^2.°C.hr.$ at between 500° and 1000° C. In general, the steel member will have a substantially constant cross-section and will be substantially continuous over its entire length. The cross-sectional shape of the embedded component is not critical and can be, for example, cruciform, H-shaped, rectilinear and the like. Equally, one or more member(s) can be embedded in the block. However, it is necessary that the ratio of the cross-section of the body of the block to the cross-section of the embedded member, at right angles to the length of the block, that is to say at right angles to the heat flux, should be such that the apparent thermal conductivity of the composite block at between 500° and 1000° C. is at least 8 Kcal.m/m².°C.hr., and preferably at least 15 Kcal.m/m².°C.hr.

The blocks of the invention are manufactured by introducing the steel member into the oxide-based material which is in the fused state in its mold.

The incorporation of a steel member of relatively high thermal conductivity into the oxide-based block has several beneficial effects:

during the manufacture of the refractory block, the insertion of the member into the molten oxide-based material has the effect of improving the structure of the oxide-based material, in particular of greatly reducing the macroporosity of the material without increasing the microporosity, thereby increasing the resistance of the refractory block to corrosion by slags. Equally, by virtue of its ability to remove heat, the inserted member restricts the formation of stresses in the block during its manufacture;

during the use of the refractory block in a furnace lining, the inserted member makes it possible to remove heat from the interior of the block, which improves the resistance of the latter during service and consequently improves its life even under severe conditions. This cooling effect, however, remains economically acceptable;

equally, during the use of the block in a furnace lining, it retains the flakes which form on the working face of the block. In effect, even if the embedded member does not extend as far as the inner face of the fresh block, chemical attack occurs when the block is first put into service, accompanied by flaking which exposes the embedded member; the latter then slows down the flaking phenomena, the flakes being retained because of being intimately enmeshed in the embedded member.

The following description made with reference to the attached drawing will assist an understanding of how the invention can be carried out.

DESCRIPTION OF THE DRAWING

FIGS. 1 and 2 are, respectively, an elevation view and a cross-sectional view of an embodiment of the refractory block according to the invention.

FIG. 3 is a plan view which illustrates the construction of furnace linings using the block of FIGS. 1–2.

DETAILED DESCRIPTION OF THE PREFERRED EMBODIMENT

FIGS. 1 and 2 show a block according to the invention, designated by the general reference 1 and consisting of a body 2 made of fused cast magnesia/chromium oxide, the block having a length of 350 mm and a cross-section of 150×130 mm and containing a mild steel member 3, the cross-section of which is in the shape of a cross, the arms of which cross have a thickness of 10 mm and a length of 40 mm. This member starts at a distance about 20 mm from the inner face 4 of the block and emerges from the block at the outer face of the latter. As illustrated, a steel sheet 6 is welded onto the member 3 at the outer face of the block. This metal sheet, though not necessary, is useful in facilitating the fitting of the block when the furnace lining is being constructed. The manufacture of this block is carried out as follows:

A composition consisting of 55% by weight of sea magnesia and 45% of Transvaal chromite is fused in an electric furnace and cast in a graphite mold having an alumina powder coating which serves as a heat insulator. The internal dimensions of the mold are 150×130×350 mm. Before the molten mass has solidified, a mild steel member which has a length greater than 350 mm and is in the shape of a cross, the arms of which cross have a thickness of 10 mm and a length of 40 mm, is dipped into the mass. A crust of solidified oxides forms on the metal; the steel member is repeatedly withdrawn and reintroduced into the bath in order to coat it completely with a solid layer of oxides. Thereafter, it is left in position, with its upper part projecting from the top of the block. The top of the mold is then covered with alumina powder and the composite block is allowed to cool slowly to ambient temperature so as to avoid the formation of stresses, as this is customary in the art of fused cast refractories. Once the block has cooled completely, it is removed from the mold, the projecting part of the steel member is cut off and the metal sheet 3 is then welded-on.

The oxide-based body of the block obtained has the following composition by weight: 55% of MgO, 20.5% of $Cr_2O_3$, 12.5% of FeO, 7.5% of $Al_2O_3$, 2.5% of $SiO_2$, 1.5% of CaO and 0.5% of $TiO_2$. It has a density of 3.6 g/cm³, whilst a conventional similar block, without any embedded member, has a density of 3.15 g/cm³. The macroporosity and the microporosity of the oxide-based moiety are very low.

The resistance of the oxide-based body to corrosion by slags is 30 to 40% greater than that of a conventional block. The wear, in a laboratory test on the oxide-based body, diminishes from 8 mm for a conventional block to 5.6 mm.

The above illustrates the beneficial effect of the insertion of the steel member on the structure of the oxide-based body of the resultant block.

Furthermore, the ability of the embedded steel member, which has a relatively high thermal conductivity, to remove heat from the interior of the block limits the growth of stresses in the block during its manufacture. This, coupled with the greater structural homogeneity, improves the resistance of the refractory block to temperature variations.

The apparent thermal conductivity of the composite block is 8 Kcal.m/m².°C.hr. instead of 4 Kcal.m/m².°C.hr. for a conventional block, but, in service, the isotherms are obviously changed in shape in the vicinity of the metal component.

If the behaviour of the blocks of the invention and of the conventional blocks, used as reference samples, are compared in a laboratory test which consists in constructing a wall formed of blocks according to the invention and of conventional blocks (without any member of relative high thermal conductivity) of the same composition, and subjecting the inner face of these blocks to temperature variations between 1,300° and 1,700° C., whilst the outer face of the blocks is cooled by circulating air, it is found that:

the steel cross is fused to a very much smaller depth than that which normally corresponds to its fusion isotherm in the conventional block, and hence the inner face of the cross has been cooled relative to the temperature applied to the inner face of the refractory blocks, and the flakes are less numerous on the oxide-based body of the blocks of the invention than on the comparison blocks. Furthermore, these flakes are retained by being intimately enmeshed with the metal cross.

In conclusion, and as confirmed by a result obtained on an industrial furnace wall, the steel member has:

improved the chemical corrosion resistance of the oxide-based body by affecting its density and structure and by cooling its inner face, and reduced its crazing and retained the flakes which have formed.

For its part, the oxide-based body has improved the average refractory character of the block, restricting the hazards connected with premature fusion of the steel, and has reduced the heat losses in the lining. The use of this type of block is recommended in UHP furnaces having an installed specific power of less than 600 KVA/ton.

FIG. 3 illustrates the construction of a furnace wall by means of blocks of the type of those of FIGS. 1 and 2.

As can be seen, the blocks 1 are simply juxtaposed side by side, with their inner face 4 turned towards the interior of the furnace. The metal sheets 6 of each block are welded to the metal sheet 20 of the furnace, the sheet 20 being cooled artificially, for example, by water circulation or air circulation, or being cooled by natural convection.

It is to be noted in particular that the usefulness of the composite blocks of the invention is not confined to the construction of steelmaking furnaces, and that these blocks can be employed wherever their ability to remove heat from the interior of the blocks may prove of value.

We claim:

1. A process for the manufacture of a fused cast block of a refractory oxide material comprising the following steps: (a) casting a molten, previously fused refractory oxide-based material into a mold, (b) introducing and withdrawing an elongated steel member into said molten material a multiplicity of times so as to coat the elongated steel member with a solid layer of refractory oxide-based material, (c) extending at least a part of said resulting coated steel member into the interior of the fused refractory oxide-based material, and (d) cooling the resultant refractory oxide-based material having said coated steel member embedded therein slowly to ambient temperature.

2. A fused cast block of a refractory oxide-based material having embedded therein an elongated steel member which extends over the greater part of the length of the block and emerges from the block on the outer surface of the latter, said steel member having a cross-section of suitable shape and surface area to impart to the composite block an apparent thermal conductivity at between 500° and 1000° C. of at least 8 Kcal.m./m$^2$°C.hr., the fused cast block being formed by a process comprising the following steps: (a) casting a molten, previously fused refractory oxide-based material into a mold, (b) introducing and withdrawing an elongated steel member into the fused material a multiplicity of times so as to coat the elongated steel member with a solid layer of refractory oxide-based material, (c) extending at least a part of the resulting coated steel member into the interior of said fused material, and (d) cooling the resultant refractory oxide-based material having said coated steel member embedded therein slowly to ambient temperature.

3. The fused cast block according to claim 2, in which the refractory material comprises at least one oxide chosen from amongst MgO, $Cr_2O_3$, $Al_2O_3$, $ZrO_2$, $TiO_2$, $SiO_2$, and mixtures thereof.

4. The fused cast block according to claim 2, wherein said block has an apparent thermal conductivity of at least 15 Kcal.m/m$^2$.°C.hr.

5. The fused cast block according to claim 2, in which the embedded steel member has a cruciform cross-section.

6. The fused cast block according to claim 2, in which the embedded steel member has an H-shaped cross-section.

* * * * *